_Fig. 6a._

_Fig. 6b._

Aug. 4, 1936.    G. W. SMITH ET AL    2,049,669
REGULATING APPARATUS
Filed Dec. 29, 1933    5 Sheets-Sheet 5

INVENTORS
George W. Smith and
James E. Specht
By Green & McCallister
His Attorneys Patented Aug. 4, 1936

2,049,669

UNITED STATES PATENT OFFICE 2,049,669

REGULATING APPARATUS

George W. Smith, Pittsburgh, Pa., and James E. Specht, Orrville, Ohio, assignors to John M. Hopwood, Dormont, Pa.

Application December 29, 1933, Serial No. 704,518

29 Claims. (Cl. 250—41.5)

This invention relates to measuring and/or regulating apparatus adapted for the measurement and/or regulation of conditions such as temperature, pressure of gaseous media, the flow of gases and liquids through pipes and conduits, the pressure gradients over the airfoil surfaces of airplane wings, etc.

An object of this invention is the provision of apparatus whereby minute changes in the pressure and/or flow of liquids or gases; the temperature of a body or medium; the pressure gradient existing on a curved surface over which a gaseous medium flows; may be accurately detected, measured and/or recorded, and/or regulated.

Another object of the invention is the provision of apparatus of the character referred to above, whereby minute measurements may be accurately and continuously made and be read directly from an indicator calibrated in terms of the medium being measured and/or regulated.

Another object of this invention is the provision of apparatus in which the current output of a grid controlled glow discharge device may be caused to vary in accordance with the particular characteristic of a variable condition to be measured and/or regulated.

Another object of the invention is the provision of a photoelectric amplifier including a light sensitive photoelectric cell and a grid controlled amplifier, a light source and means for projecting an oscillating beam of light on the photoelectric cell, and a rotating disc or screen having apertures or slots therein of predetermined shape which slots in conjunction with the light beam definitely fix and determine the value of the current passed by the glow discharge device in accordance with the position of the light beam and the shape of the slots or apertures.

A further object of the invention is the provision of means for so varying the time phase relation between the impingement of the light beam on the photoelectric cell and the alternating current voltage impressed on the plate circuit of the glow discharge device that the output of said discharge device will bear any predetermined or arbitrary relationship to the magnitude of a variable to be measured and/or regulated.

A still further object of the invention is a provision of a photoelectric amplifier unit and a grid controlled glow discharge device in combination with an apertured or slotted rotating disc and an oscillating light beam, the oscillations of which are controlled by and in accordance with changes in a variable to be measured and/or regulated, for controlling the operation of powerful regulators or motive devices and cause such devices to operate by and in accordance with the magnitude of the current flowing in the glow discharge device.

A still further object of the invention is to provide a novel means for controlling the current output of a grid controlled glow discharge device.

And a further object of the invention is to provide a novel optical mechanical means for controlling the energization of a photo-electric cell which in turn may be utilized to control or effect the application of a control voltage to the grid of a glow discharge device to obtain a variable but controlled current output therefrom or a current output which bears a desired or predetermined relationship to a variable condition or quantity.

Other objects of the invention will, in part, be apparent and will, in part, be obvious from the following description taken in conjunction with the accompanying drawings, in which.

Throughout the drawings and the specification, like reference characters indicate like parts.

In the various forms of the invention illustrated in the drawings, one or more glow discharge devices may be utilized in the measurement and/or recording and/or regulation of one or more variables. In the form shown in Figs. 1 and 5, only one glow discharge device indicated at 10 is utilized, while in the forms illustrated in Figs. 4 and 6, a plurality of such devices are utilized and designated by reference characters 10 and 10', respectively. In each of these forms, glow discharge devices 10 perform the same function, but in Figs. 4 and 6, devices 10 and 10' are utilized to effect separate and different functions. A glow discharge device such as indicated at 10 or 10' may be considered as a thermionic tube having an anode and cathode and a filling of gas or other ionizable medium through which current passes from the anode to the cathode when a voltage of sufficient value is impressed across the anode and cathode with the anode of positive polarity with respect to the cathode. Such a device may also include a grid, and when employed, current flows from the anode to the cathode when the voltage impressed across the anode and cathode is of sufficient magnitude, with the anode of positive polarity with respect to the cathode, provided the grid bias is of the proper value and polarity when such voltage is applied. When the current once starts to flow, it continues to flow until the voltage across the anode and cathode is reduced to substantially zero value or is interrupted.

The invention is primarily directed to the manner of regulating the output current of the glow discharge device or devices and the use to which such current is put for the measurement and/or regulation of variables of one sort or another.

In order that the invention may be more readily understood, the mode of operation of the glow discharge devices 10 and 10' will be set forth. Glow discharge devices 10 and 10' may, for convenience, be considered as identical, each comprising an anode or plate 11, a cathode or filament 12 and a grid 13 disposed in an evacuated envelope having a suitable inert but ionizable gas therein.

Figures 1, 2, 3:
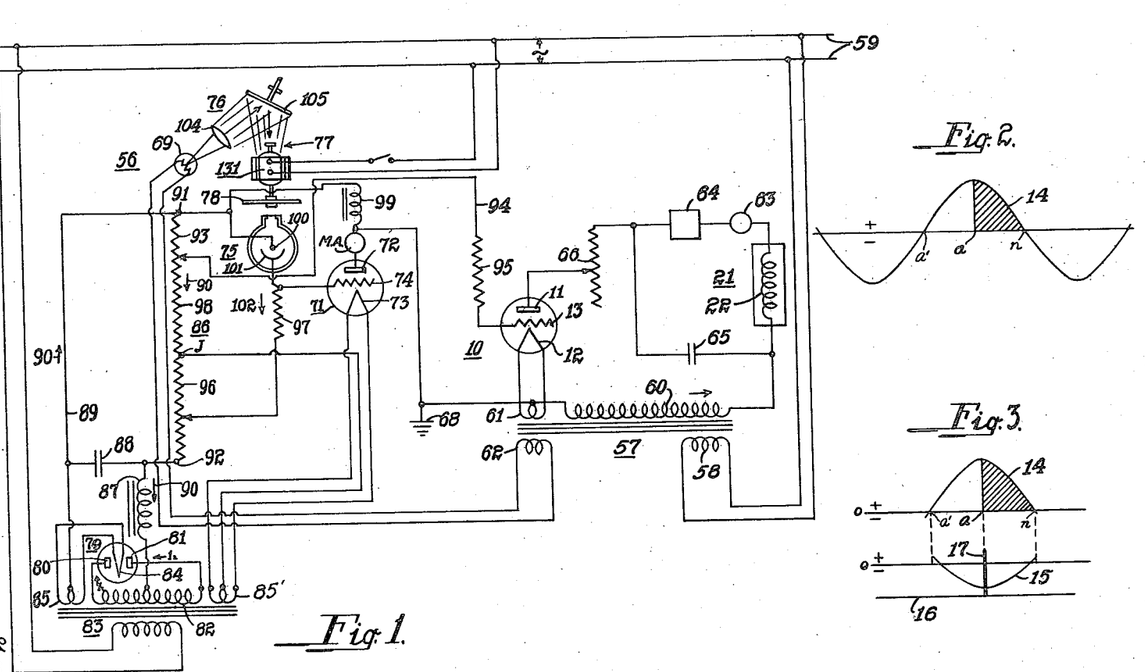
Figure 1 is a diagrammatic illustration of circuits and apparatus arranged and constructed in accordance with one embodiment of the invention.
Fig. 2 is a graphic illustration of the alternating current voltage applied to the plate circuit of a glow discharge device embodied in the circuits and apparatus of Fig. 1.
Fig. 3 is a diagrammatic or graphic illustration showing the discharge characteristics of the glow discharge device as affected by the relation of the plate and grid voltages applied thereto.

The discharge characteristics of such devices are graphically illustrated by Figs. 2 and 3, in the case where alternating current voltages are applied to the plate circuits thereof. In these graphs, the plate circuit voltages are represented by the sinusoidal curves 14. Current flows in the plate circuits of these devices whenever the critical breakdown voltage thereof is exceeded, and the current flows only during the positive half cycle of the voltage. If the critical voltage is exceeded at any point in the positive half cycle, the device will break down and current will flow for the remainder of such cycle. If the grid of such a device is maintained sufficiently negative, the device will not pass current. Thus, if a negative grid bias voltage corresponding to the critical curve 15 of Fig. 3, is applied to the grid and disposed 180 degrees out of phase with the plate circuit voltage, no current will flow in the plate circuit. But, if the grid is made more positive at any point along the critical grid bias curve 15 and while the plate voltage is positive, the device will immediately break down and pass current for the remainder of the positive half cycle of the plate voltage.

A glow discharge device when operated on alternating current will pass current during substantially the entire period of each positive half cycle, the current flow being interrupted at the end of each such cycle and for the period of each negative half cycle, assuming the grid bias is of the proper value and polarity. Thus the positive half cycles of the alternating current voltage may be considered as the equivalent of a source of interrupted uni-directional voltage, or direct current voltage. For example, if a direct current voltage of sufficient value is applied across the anode and cathode, and interrupted at any time or periodically, current will flow when the voltage is applied, cease when interrupted, and start again when the voltage is reapplied, after the fashion depicted by the curves of Figs. 2 and 3.

In accordance with this invention, the grid is given an excessive negative bias, such as represented by curve 16, so that the glow discharge device will not normally pass current, passing current only when a breakdown grid voltage from another source is applied. Such a breakdown voltage may be termed a control voltage. The output current of the device is regulated by varying the time, with reference to the periodicity of the plate circuit voltage, that the breakdown voltage is applied in accordance with changes in a variable to be measured and/or controlled. This breakdown voltage is preferably instantaneous or of steep wave front form so that by controlling its time of application in any positive half cycle of the plate voltage, the amount of current passed by the glow discharge device may be regulated or varied in any desired manner.

For example, if an instantaneous positive grid bias voltage such as indicated at 17 is applied to the grid at a time corresponding to point $a$ or at any point between $a'$ and $n$ in the positive half cycle of the alternating plate voltage, the glow discharge device will break down and current will flow in said plate circuit during the remainder of the half cycle as indicated by the shaded areas under curves 14, Figs. 2 and 3. It will, therefore, be apparent that by controlling the time at which such positive bias voltage is applied during any positive half cycle of the plate voltage, the average current output of the glow discharge device may be varied in accordance with the variations in the time of application of said grid bias voltage.

In accordance with this invention, means are provided for applying the aforementioned grid bias voltage to the grid of the glow discharge device in synchronism with the positive half cycles of the plate circuit voltage and at such times during the positive half cycles that the output current of the glow discharge device will vary in accordance with changes in the particular variable or condition to be measured and/or controlled.

The particular variable may be determined by measuring the plate circuit current of the glow discharge device by means of appropriate current measuring instruments calibrated in terms of the variable; or changes in the variable may be recorded on a recording instrument; or if the variable is to be maintained substantially constant or controlled in any desired fashion, the output current of the glow discharge device may be utilized to operate apparatus adapted to regulate or control the particular variable under consideration.

Figure 13:
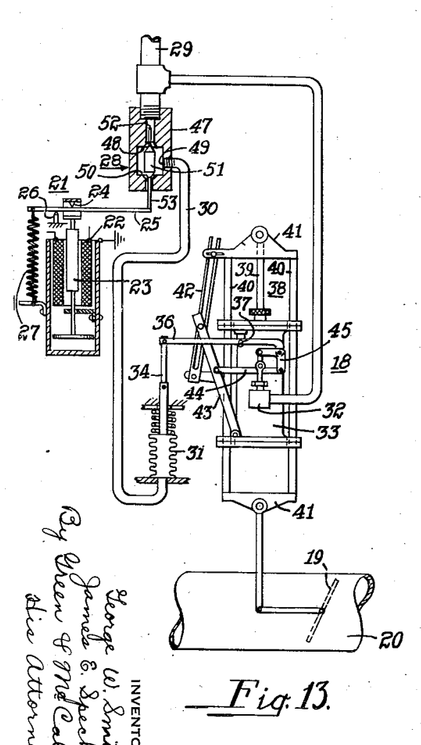
Fig. 13 is a more or less diagrammatic illustration of regulating apparatus adapted to be operated and controlled by and in accordance with changes in the current in the output circuit of a glow discharge device such as embodied in the circuits and apparatus illustrated in Figs. 1, 4, 5, and 6.

By way of example, the output current of devices 10 or 10' may be utilized to govern the operation of apparatus such as shown in Fig. 13. Such apparatus may comprise a regulator 18 arranged to operate a damper or valve 19 disposed in a pipe line 20. The pipe line may, for explanatory purposes, be considered as one conveying gas or fluid, and that regulator 18 is to adjust the damper or valve in such manner that the flow in the pipe line will be maintained substantially constant, or that the pressure, at which the gas or fluid is delivered to any given point, is maintained substantially constant.

Figure 4:
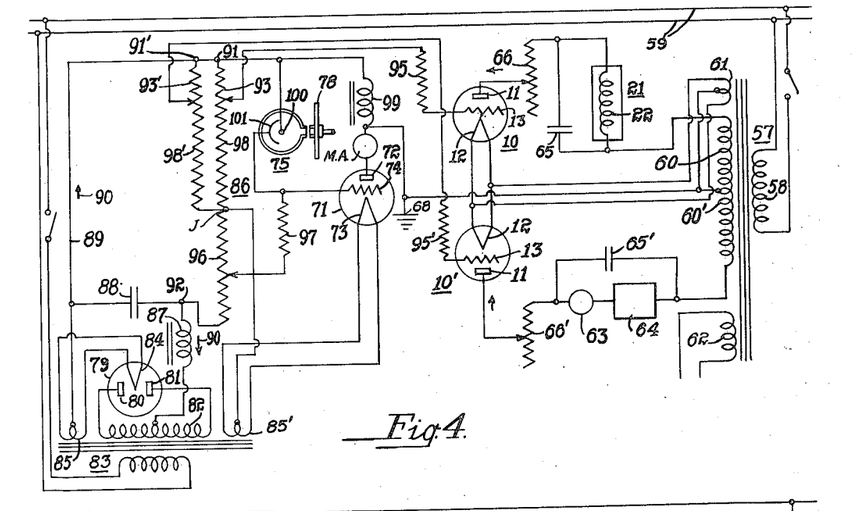
Fig. 4 is a diagrammatic illustration of circuits and apparatus embodying a modified form of the invention whereby a plurality of characteristics of a variable condition may be measured simultaneously, but independently.

As will be pointed out subsequently herein, the output current of the glow discharge device is caused to vary by and in accordance with the particular characteristic of the fluid or gas to be measured and/or regulated. If the pressure is to be maintained constant then the current in the glow discharge device is caused to vary by and in accordance with such pressure variations; and if the flow is to be measured and/or regulated, the current in the glow discharge device is caused to vary by and in accordance with such flow variations. By means of the system shown in Figs. 1 and 5, either flow or pressure may be measured and/or regulated, while the systems of Figs. 4 and 6 provide for the measurement and/or regulation of flow (or pressure) in accordance with two electrical impulses which can bear the same or different relationships to the flow (or pressure).

In order that the regulator 18 of Fig. 13 may be actuated by and in accordance with the changes in the plate current of glow discharge device 10, a solenoid operated pressure sending device 21 may be utilized. This device comprises a solenoid 22 connected in circuit with the plate circuit of the glow discharge device 10, a movable core 23 suspended by a knife edge 24 from a lever 25 that is fulcrumed on a knife edge support 26. When the current traverses the solenoid, core 23 is moved by the solenoid whereby lever 25 is rocked on its fulcrum support, which rocking movement is opposed by a relatively long spring 27. Lever 25 operates an escapement valve 28 connected between a pressure supply line 29 and a receiving line 30 and arranged to vary the pressure in the receiving line and in a pressure responsive regulating element 31, such as a bellows. Bellows 31 operates a pilot valve 32 which controls the admission of motive fluid, such as compressed air, to one side or the other of a piston working in a cylinder 33 of the regulator.

If the pressures admitted to sending line 30 are increasing, bellows 31 contracts and moves a link 34 upwardly; whereby the link rocks a bar 36, that is fulcrumed at 37, in a clockwise direction and causes the valve plug of the pilot valve to move downwardly to admit motive fluid to the lower side of the piston, in response to which the piston moves upwardly. As the piston moves, a regulator frame 38 mounted on a piston rod 39 and including side bars 40 and cross heads 41, is moved upwardly to thereby shift damper or valve 19 towards open position. When the frame has moved upwardly a predetermined distance, the pilot valve is automatically returned to off position, by means of a system of levers and links, causing the piston to stop and remain at rest until the pressure transmitted to the bellows 31 is again increased sufficiently to actuate the pilot valve to that position which effects upward movement of the piston.

The system of links and levers referred to above includes an angling bar 42 carried by the regulator frame, a lever 43, a link 44 and a bell crank 45. The knee of the bell crank is pivotally connected to rocker bar 36; the horizontal leg of the crank is connected to the valve stem; and the vertical leg of the crank is connected to link 44. Thus, whichever direction the rocker bar 36 is turned to effect either upward or downward movement of the pilot valve stem, the angling bar 42, lever 43, link 44 and the bell crank 45 cooperate, in response to movement of the regulator frame, to shift the pilot valve in the opposite direction to off position. By means of this valve operating mechanism, step-by-step movement of the regulator frame, and consequently step-by-step adjustment of the damper or valve or whatever other apparatus is connected for operation by the regulator 18, are attained.

If the pressures transmitted to bellows 31 are decreasing the opposite action of the pilot valve and its operating mechanism occurs to effect step-by-step movement of the regulator frame in a downward direction with consequent step-by-step adjustment of the damper or valve towards closed position.

The escapement valve 28 comprises essentially a valve body 47 having an inlet port 48 connected to the pressure supply pipe 29, an outlet port 49, which is connected to the pressure sending line 30, and an exhaust port 50 that communicates with the atmosphere. The inlet port 48 and the exhaust port 50 are controlled by a valve 51 which is provided with tapered or conical surfaces at its opposite ends that cooperate with tapered seats of the inlet and exhaust ports. The opposite ends of this valve have extensions 52 and 53 operating in the inlet and exhaust ports to guide the valve as it moves in the valve body. The lower extension of the valve rests on lever 25.

If it be assumed that the valve is in its extreme closed position, that is, in that position which closes inlet port 48, then the exhaust port is open so that the compressed air in the sending line 30 and bellows 31 may exhaust to the atmosphere. And if this valve is in a position to completely close the exhaust port, then the inlet port is open and the pressure in the receiving line and the bellows will increase to a value equal to the value of the pressure in the sending line. If the valve is in any intermediate position a throttling action occurs at the inlet and exhaust ports, whereby the pressure within the valve body, the receiving line, and the bellows will vary by and in accordance with the position of valve 51. Thus, it will be apparent that valve 51 is operative to produce an infinite number of different pressures in receiving line 30 and bellows 31 depending upon the position of valve, as determined by the position of the core 23.

Having thus described the glow discharge devices; their mode of operation; in general the manner in which the output current thereof may be varied; the use to which the output current may be put, and one form of apparatus that may be controlled by such output current, the circuits and apparatus for controlling the output current of the glow discharge device or devices as illustrated in Figs. 1, 4, 5, 6 and 7 to 12, inclusive, will now be described.

In Fig. 1 of the drawings, the glow discharge device 10 is shown in conjunction with a photoelectric amplifier 56 that includes means for impressing an instantaneous or steep wave front voltage on the grid of device 10 at such times in the positive half cycle of the alternating current voltage applied to the plate circuit thereof that its output current may be varied in any desired manner, or in accordance with changes in a variable to be measured and/or controlled.

The source of voltage for the plate circuit and filament of device 10 comprises a transformer 57 having a primary winding 58 connected to alternating current power supply conductors 59, a relatively high voltage secondary winding 60 and low voltage windings 61 and 62. Winding 60 is connected across the filament 12 and plate 11 with solenoid 22 in series therewith. An indicating current measuring instrument 63, and a recording instrument 64 may be included in series with the plate circuit and calibrated in terms of the particular variable to be measured and/or recorded. A condenser 65 may be connected across the portion of the circuit including the solenoid 22 and instruments 63 and 64 to smooth out the pulsating current passed by glow discharge tube 10. The current output of the plate circuit may be limited to any desired maximum value by means of an adjustable rheostat 66.

Filament 12 is connected to low voltage winding 61 the electrical midpoint of which may be grounded as indicated at 68.

Low voltage winding 62 is utilized to energize a light source such as an incandescent lamp 69 embodied in the photoelectric amplifier 56.

The photoelectric amplifier comprises an amplifying tube 71, of any well known construction, having a plate 72, filament 73, grid 74; a photoelectric cell 75, means 76 for projecting a beam of light 77 on the photoelectric cell; and a rotating screen or disc 78 adapted to control the time or instant that the light beam impinges on the photo cell with reference to the positive half cycles of the alternating current voltage applied to the plate circuit of device 10.

In accordance with this invention, means are provided for oscillating the light beam in accordance with a variable to be measured and/or controlled so that the position of the light beam in conjunction with the rotating screen or disc may definitely fix the points in the positive half cycles of the alternating current plate voltage of device 10 in which this device breaks down and passes current.

The source of voltages required for the proper operation of the photoelectric amplifier 56 comprises a double wave thermionic rectifier 79, the plates 80 and 81 of which are connected to the opposite terminals of a secondary winding 82 of a transformer 83 and the filament or cathode 84 of which is connected to a low voltage winding 85 of such transformer; and a potentiometer 86 connected in series with the output circuit of the rectifier. The output circuit of the rectifier includes also a choke coil 87 connected in series with the potentiometer to the neutral or midpoint of the transformer winding 82; and a condenser 88 connected to the common connection between the resistor and choke coil and to a conductor 89 leading from the midpoint of the low voltage winding 85 to the positive terminal of the potentiometer. Transformer 83 also includes a low voltage winding 85' for energizing filament 73 of the amplifying tube 71, and the neutral point of this winding is connected to the junction j of potentiometer sections 96 and 98.

In operation of the rectifier, the flow of current is from one or the other of plates 80 and 81 of the rectifier to the filament 84, thence from the midpoint of the low voltage winding 85, through conductor 89, potentiometer resistor 86, choke coil 87 to the midpoint of transformer winding 82 and thence to one or the other of the plates of the rectifier. For convenience, the flow of current in the rectifier circuit and the potentiometer is indicated by arrows 90. The flow of current through the potentiometer resistor produces a voltage drop in the direction of current flow and this voltage drop is utilized to operate amplifying tube 71 and to provide a fixed negative bias (such as represented by curve 16, Fig. 3) for the glow discharge device 10, tending to normally maintain the glow discharge device at zero plate current.

Since the voltage drop through the potentiometer resistor 86 is in the direction indicated by arrows 90, terminals 91 and 92 thereof may be considered as positive and negative respectively.

Section 93 of potentiometer 86 is connected by a conductor 94 and a protective resistor 95 to the grid 13 of the discharge device 10 and provides the normal negative bias tending to normally maintain device 10 at zero plate current. The negative bias for the grid of amplifying tube 71 is furnished by section 96 of the potentiometer, there being a resistor 97 in series with grid 74 and the potentiometer.

The voltage for the plate circuit of amplifying tube 71 is furnished by sections 93 and 98 of the potentiometer. The plate circuit includes an impedance 99 having high inductance which, when traversed by current, develops a high substantially instantaneous voltage (such as represented by curve 17 of Fig. 3) that neutralizes the negative grid bias voltage normally impressed by section 93 on the grid of device 10 and makes the grid sufficiently positive to cause this device to break down and pass current.

The photoelectric cell includes an anode 100 connected to the positive terminal 91 of potentiometer 86 and a cathode 101 connected to the junction of grid 74 and resistor 97. Thus, when a beam of light shines on the photo cell, current flows in the direction of arrow 102 through resistor 97, whereby grid 74 is made sufficiently positive to cause current to flow in the plate circuit of amplifier 71. When current flows in this plate circuit, the breakdown voltage for the grid of device 10 is induced in impedance 99.

The means illustrated for energizing the photoelectric cell 75 and controlling its time of energization with reference to the plate circuit voltage of device 10 may comprise a light source such as an incandescent lamp 69 having a filament designed to produce a substantially point source of light; and a lens 104 through which the light shines onto a reflecting mirror 105. The mirror, in turn, reflects the light onto the photoelectric cell 75. The light source, lens, mirror and photoelectric cell are so positioned that a substantially point beam is focused on the revolving disc 78 placed immediately in front of the photo cell.

The beam of light does not shine continuously on the photo cell as it is intercepted by the rotating screen or disc 78 once each half cycle of the voltage impressed on the plate circuit of device 10. In other words, the photoelectric cell is illuminated only once during each half cycle of the alternating voltage for device 10 and the duration or time of illumination is only momentary.

Mirror 105 is mounted to tilt about a fixed axis so that as it tilts in one direction or another, the light beam reflected on the photoelectric cell will oscillate in a fixed plane. The rotating disc or screen is so slotted or apertured that as the position of the light beam varies in its plane of oscillation, the time at which the breakdown grid bias voltage is applied to the grid of glow discharge device 10 is caused to vary with respect to the phase time of the positive half cycles of the alternating current voltage applied to the plate of this device.

The mirror may be tilted by any desired means, that is any device that will detect, and respond to, changes in a variable to be measured and/or regulated. If changes in the pressure of a gas or fluid are to be measured, the mirror may be operated by means of a pressure responsive device such as a bellows 107, of any suitable type, disposed in a chamber 107' to which varying pressures may be communicated by a pipe 108. As the pressure acting on the bellows changes, the bellows either contracts or expands, depending upon the direction of pressure change, and tilts the mirror whereby the position of the light beam is changed and the breakdown points of the glow discharge device altered so that its current output is caused to vary with the changes in pressure.

If bellows 107 is made of a metal having a high temperature coefficient of expansion, member 107a connecting the bellows to the mirror support lever should have such a coefficient of expansion as to compensate for changes in length of the bellows caused by changes in temperature. When bellows 107 is made of brass we have found that if member 107a is of aluminum, changes in length of the bellows as the result of temperature changes are automatically compensated for by similar changes in length of member 107a.

Figures 11, 12:
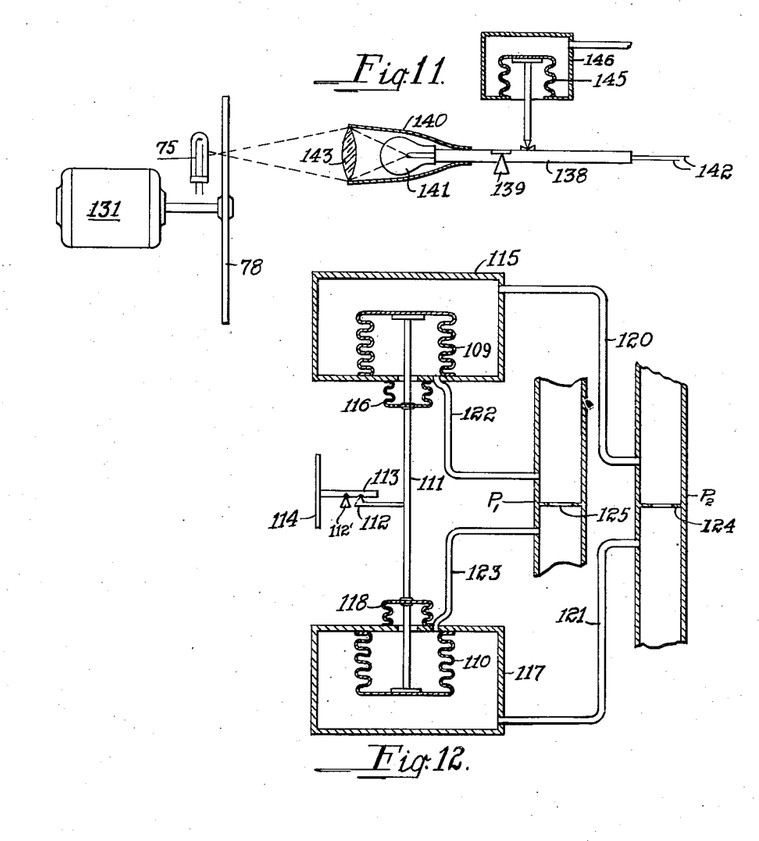
Fig. 11 is a more or less diagrammatic view partly in section of a motor driven rotating disc interposed between a photoelectric cell; and a light producing member positioned to focus a beam of light on the photo cell, and a pressure responsive member for oscillating the light producing member in accordance with changes in a variable to be measured and/or controlled.
Fig. 12 is a diagrammatic view of the pressure apparatus arranged to measure the difference between the pressure drops across orifices disposed in separate pipe lines, and tilt or shift a reflecting mirror such as shown in Figs. 7 and 9, and thereby vary the position that a light beam reflected therefrom impinges on the rotating disc and the photoelectric cell.

If the flow of a gas or fluid is to be measured and/or controlled, an arrangement of bellows or pressure responsive elements may be utilized that will tilt the mirror by and in accordance with changes in the pressure drop across a fixed orifice, and the output current of device 10 varied by and in accordance with such changes; or if the temperature of a furnace or other body is to be measured and/or controlled, a temperature responsive device may be utilized to tilt the mirror by and in accordance with changes in temperature; or if a predetermined or desired relationship is to be maintained between the flow of gases or liquids in separate pipe lines P1 and P2, an arrangement of pressure responsive devices such as shown in Fig. 12 may be utilized.

In the arrangement of Fig. 12, the pressure responsive apparatus comprises two pressure sensitive members such as bellows 109 and 110 each arranged to respond to two oppositely acting pressures. These bellows are rigidly connected together by a rod 111 having a knife-edge connection 112 with a lever 113 on which a mirror 114 is mounted which, with lever 113, rotates around fulcrum 112'. Thus, as the rod moves, the mirror tilts.

Bellows 109 is disposed within a pressure tight chamber 115 which is sealed at the opening through which rod 111 passes with a relatively light but flexible bellows 116. Bellows 110 is disposed in a pressure tight chamber 117 and sealed at the opening through which rod 111 passes by a bellows 118 similar to bellows 116.

These bellows may be connected differentially by pipes 120, 121, and 122, 123 to the opposite sides of orifices 124 and 125 in such fashion that movement of the mirror is caused to follow any relative variation in the pressure drops across them. The output of glow discharge device 10 may then be utilized to measure the relative difference in flow and to regulate the flows in the lines so as to maintain the desired relationship.

As was stated previously herein, the shape of the slots in disc 78 determines or fixes the characteristic of the output current curve of the glow discharge devices 10 or 10'. Disc 78 as shown in Fig. 10, is provided with curved slots 127, 128, 129 and 130 that extend from an inner portion of the disc to an outer portion thereof. The inner ends of the slots begin at a circle of radius R and terminate at a circle of radius R1. As the drawings show, the slots in the disc are non-concentric with respect to the axis of rotation thereof.

In order that each slot may be operative throughout a complete half cycle of the plate voltage of device 10, the disc is driven by a synchronous motor 131 and each slot made to such length that each one will sweep through the light beam in the same length of time as is required for the plate voltage of device 10 to pass through a half cycle.

If the disc is driven by a consequent pole type alternating current motor which, in effect, is an induction motor capable of operating at synchronous speed, as many slots as the motor has poles are required. These slots are spaced 180 electrical degrees apart so that when the motor is started and brought up to synchronous speed, there will always be a pair of slots disposed 180 electrical degrees apart through which the light beam may shine and therefore make certain that the steep wave front voltages impressed on the grid of device 10 will always be in phase with and occur at some time during the positive half cycles of the alternating plate voltage of this device.

If a salient pole motor is utilized and provided with direct current field windings, only half the number of slots required for a consequent pole motor would be necessary. These slots, of course, would be 180 electrical degrees apart and separated by solid sections of disc, each embracing an angle of 180 electrical degrees.

If a salient pole synchronous motor having direct current field windings is utilized, the disc may also be provided with as many slots disposed 180 electrical degrees apart as the motor has poles, but in this case, one set of alternate slots would be utilized to control the output current of one grid glow discharge device and the other set of slots would be used to control the output current of another glow discharge device. In such case, one set of alternate slots may be of one shape and the other set of another shape, so that more than one characteristic of a variable may be measured at the same time with a single photoelectric cell, rotating disc, and amplifying tube. A disc having one set of alternate slots of one shape, and another set of alternate slots of another shape, is shown in Fig. 10a, slots 127' and 129' being of one shape and slots 128' and 130' of another shape. This type of disc would be most suitable in systems having two glow devices 10 and 10'.

If it be assumed that the disc of Fig. 10 is rotating in a clockwise direction and that the light beam is oscillating in a vertical plane, that is along diameter Y—Y thereof; and if it be assumed that the beam of light strikes the disc at the circle of radius R1, and that the slots are in the position indicated when the alternating current voltage applied to the plate of device 10 is zero in value but at the beginning of a positive cycle, then the photoelectric cell will be energized, and the glow discharge device will break down at the beginning of a half cycle and current will flow for substantially the entire period of such cycle.

If the point at which the light beam strikes the disc is at any point between the circle of radius R1 and the circle of radius R, it will be apparent that the time at which the light passes through the slots to the photoelectric cell will occur later in the positive cycle of the plate voltage of devices 10 or 10', so that the length of time that the glow discharge device passes current will decrease and will continue to decrease as the light beam approaches the inner ends of the slots.

Thus, for each position of the light beam there will be a different but definite time in the positive half cycles of the plate voltage of devices 10 or 10' at which break down occurs.

From the above it will also be apparent that for each position of the light beam as fixed by the angle of the mirror 105 or 114, there will be a definite value of output current in device 10. If the mirror is actuated by a pressure responsive device, then for each value of pressure there will be a definite value of current.

By giving the slots in the disc a shape corresponding to the graph characteristic of the variable being measured or controlled, the output current of the glow discharge device will have the same graph characteristic as the variable. Thus, if it is desired that there shall be a linear relation between the pressures acting on the bellows that operates the mirror, and the output current of the glow discharge device, the shape of the leading edges of the slots in the disc may be made in accordance with the equation $$\rho = R(R_1 + R)\left(\frac{1-\cos\theta}{2}\right)$$

in polar coordinates; where $\rho$ is the polar radius; R is the radius of the inner circle; $R_1$ is the radius of the outer circle and $\theta$ is the angle in electrical degrees.

From the above equation it will be apparent that the relationship between the current output of devices 10 or 10' and the pressure or pressures acting to tilt mirror 105 or 114, may be made to assume various predetermined characteristics. For example, the current may be caused to vary either as the square, cube, square root, or any other exponential function of the pressure, provided there is no point in the range of the system where two different values of the variable or quantity under consideration would produce the same output current in devices 10 or 10' and these characteristics may be obtained by giving the desired shape to the slots of the disc.

The equation above stated for the curvature of the slots is for the leading edges of the slots and not the trailing edges thereof. The width of each slot may be made such as to permit a light beam, of say ⅛ inch square, to pass through the same to the photo-cell. However, the actual width of the slots or the shape of the trailing edges thereof are not of vital importance so long as the trailing edges intercept the light beam in time to prevent the illumination of the photoelectric cell to continue for a longer period of time than is represented by a half cycle of the alternating current voltage applied to the plate circuit of the glow discharge devices 10 or 10'. The important consideration is the shape of the leading edges of the slots so that timely and abrupt illumination of the photoelectric cell is accomplished.

By utilizing a disc, such as above described, the calibration of the various systems is not affected by loss of effectiveness of the amplifying tube and the glow discharge device caused by ageing. When the system has once been adjusted a gradual change in the calibration of the amplifying tube and the glow discharge device does not affect the operativeness or sensitivity thereof until a critical point is reached in the grid bias conditions of devices 10 or 10'. With a further decrease in the positive bias supplied to these devices, or in the event an increase in the positive bias is necessary to cause break down to occur, the slots in disc 78 will eliminate any possibility of a positive bias remaining to effect a break down at a later point in the cycle than that which is determined by the relative time at which the light beam impinges on the photoelectric cell with reference to phase time of the positive half cycles of the plate voltage of devices 10 or 10'.

In order to adjust the system illustrated in Fig. 1 so that the breakdown grid voltages supplied to the grid of devices 10 to 10' will occur in synchronism with and during the positive half cycles of the plate voltage of this device, the grid of amplifier tube 71 is connected through resistor 97 to such a point on section 96 of the potentiometer resistor that a small amount of current flows in the plate circuit of the amplifier tube with no light shining on the photoelectric cell 75. While the photoelectric cell is still dark, the voltage supplied by section 93 of the potentiometer to the grid of device 10 is adjusted until this device stops glowing, but is on the verge of glowing or discharging. The negative grid bias voltage applied to the grid of device 10 may then be increased still further, say 10% more than is necessary to prevent the device from discharging. This adjustment insures that device 10 will not pass current until the photoelectric cell 75 is illuminated.

With the mirror 105 connected for operation by a bellows which is detecting pressures to be measured and/or regulated, the stator of motor 131 which is adjustably mounted in a cradle 133, is turned in one direction or another until a point of maximum current flow in the plate circuit of devices 10 or 10', as measured by meter 63, occurs with a pressure acting on the bellows of such value that the light beam is focused either at the outer end of the disc slots or at the inner ends of these slots. If maximum current flow is to occur when maximum pressure is acting on the bellows and the light beam is focused at the outer ends of the slots, the minimum current flow should occur in response to minimum pressure, at which time the light beam would be focused on the circle of radius R. The maximum current may be adjusted by means of a rheostat 66. Since, as the light beam oscillates radially on disc 78 between circles of radius R and R1, respectively, meter 63 may be calibrated in terms of the variable being measured, in this case, pressure. A system when thus adjusted will operate in the pressure range above described.

The system shown in Fig. 4 is similar to the system shown in Fig. 1, except that an additional glow discharge device, designated as 10', is utilized, and that additional potentiometer sections 93' and 96' are provided whereby an adjustable grid bias voltage may be applied to the grid of glow discharge device 10' in the same manner that section 93 furnishes the negative bias for glow discharge device 10 in Fig. 1. The plate circuits of the glow discharge devices 10 and 10' are provided with alternating current voltage windings disposed 180 electrical degrees out of phase so that during the positive half cycles of the voltage, device 10 discharges current, and during the negative half cycles device 10' passes current. The output current of device 10 may be utilized to operate a solenoid operating sender 21, such as described in connection with Fig. 13, and the output current of device 10' may be utilized to measure and/or record the rate of flow or pressure of a gas or liquid or any desired characteristic of a particular variable.

If disc 78 is driven by a four pole synchronous motor of the consequent pole type, and provided with four slots spaced 180 electrical degrees apart and if these slots are of the same shape, the relation of the current output of the glow discharge devices 10 and 10' to the variable which is utilized to operate mirror 105 or 114 will be the same, assuming the circuit constants and voltages utilized in the circuits for both discharge devices are the same.

If a four-pole synchronous motor having direct current field windings is utilized for driving a disc having four slots therein and alternate pairs of these slots are given different shapes, the relation of current output for devices 10 and 10' to the variable force which tilts mirror 105 or 114 may be given different and distinct characteristics. Thus, for example, glow discharge device 10 may be utilized to operate the solenoid sender 21 and cause it to send out pressure control impulses to bellows 31 for purposes of regulation in accordance with a predetermined current pressure relationship, while device 10' may be utilized to indicate and/or record the flow of a medium such as gas, for example, or for operating a sender such as 21 and cause it to send out pressure variations according to another and perhaps different current pressure relationship.

Figure 5:
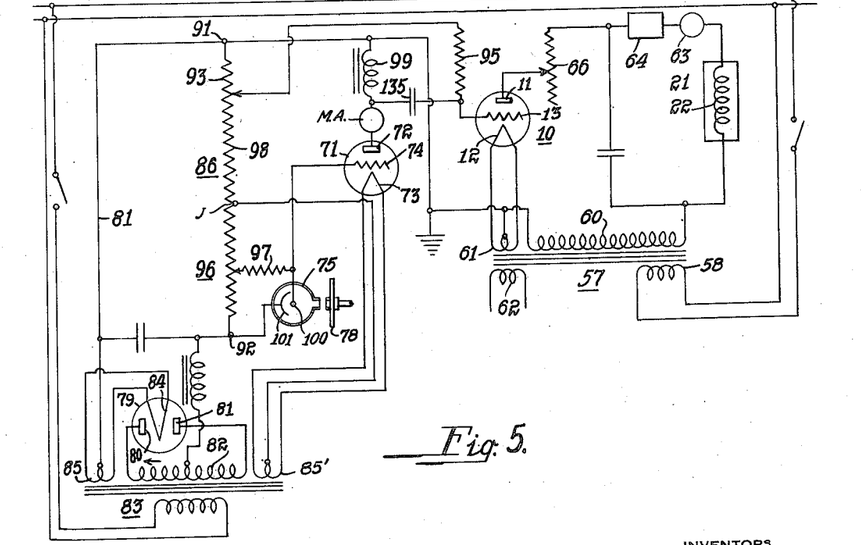
Fig. 5 is a diagrammatic illustration of circuits and apparatus embodying a still further modified form of the invention.
Figures 6, 7, 8, 9, 10, 10A:
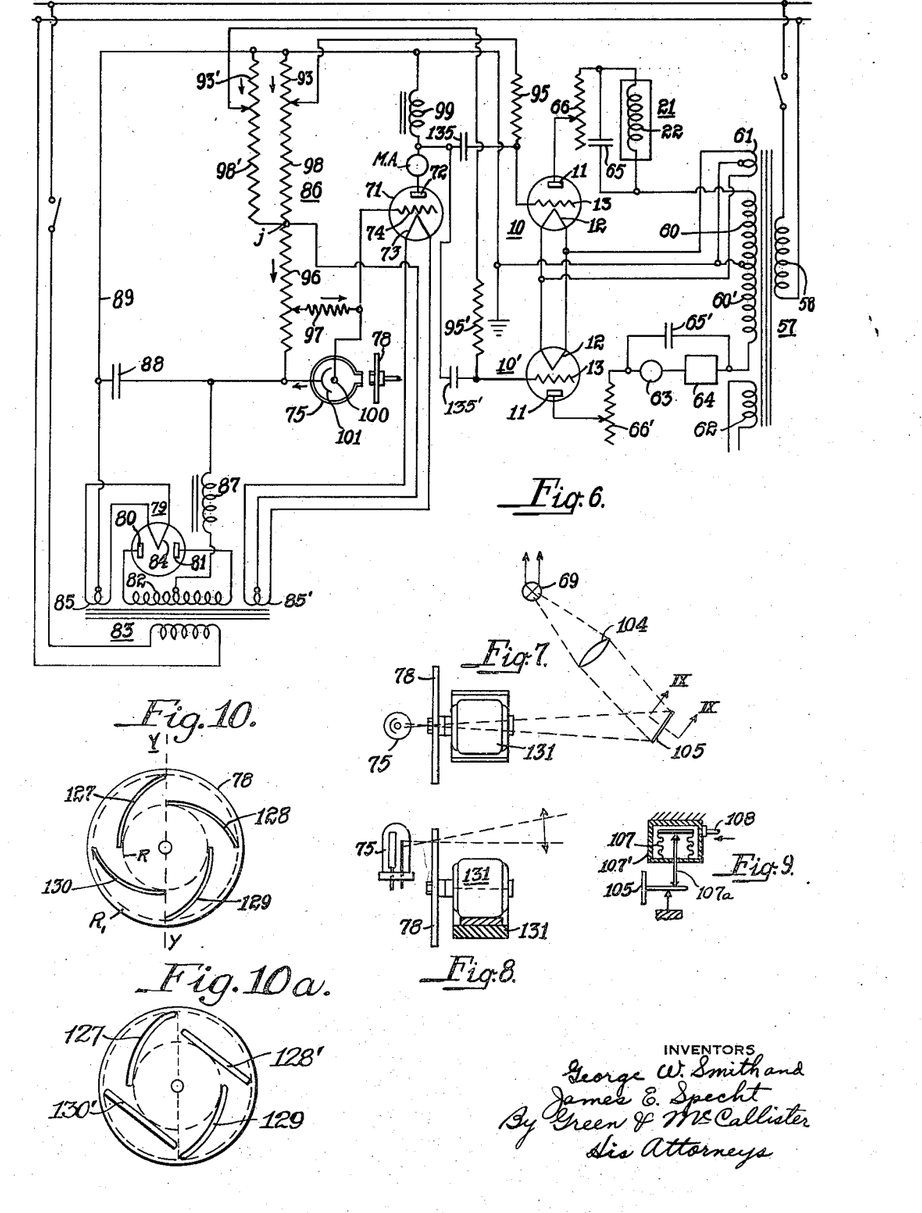
Fig. 6 is a diagrammatic illustration of circuits and apparatus which is a modification of the form illustrated in Fig. 5.
Fig. 7 is a more or less diagrammatic view of the photoelectric cell, a light source, an oscillating mirror arranged to reflect a beam of light on the photoelectric cell and a revolving disc having slots or apertures therein interposed between the mirror and the photoelectric cell.
Fig. 8 is a view in side elevation of the photoelectric cell, the rotating disc and a motor which drives the disc.
Fig. 9 is a diagrammatic view, parts being shown in section, of a pressure responsive element utilized to change the angular position of the reflecting mirror of Fig. 7, by, and in accordance with changes in a variable to be measured and/or controlled.
Fig. 10 is a plan view of a slotted or apertured rotating disc such as shown in Figs. 7 and 8 and in Figs. 1, 4, 5, and 6.
Fig. 10a is a view similar to Fig. 10 showing a disc provided with a set of slots having one shape or graph characteristic, and another set of slots having a different shape or graph characteristic.

In Fig. 5 of the drawings, a modification of the system shown in Fig. 1 is illustrated. In order to start a glow discharge in device 10 it is necessary to momentarily illuminate the photo cell 75, which action, in the circuit of Fig. 1, causes an increase in plate current in amplifier tube 71, but in the circuit of Fig. 5 causes a decrease in plate current in amplifier tube 71. In other respects, the system of Fig. 5 is identical with the system of Fig. 1, with the exception that in Fig. 1 the plate side of impedance 99 is connected to ground, whereas in Fig. 5, the terminal of the impedance which is connected to the positive terminal of the potentiometer in Fig. 1 is connected to ground, and a condenser 135 is connected between the plate of the amplifier tube 71 and the grid of the glow discharge device 10.

In the operation of the system shown in Fig. 5, the voltage applied to grid 74 of the amplifier tube 71 is made such that normally a relatively large current flows in the plate circuit of the tube and the impedance 99 when photo cell 75 is dark. When cell 75 is illuminated, current flows from the potentiometer 86, through resistor 97 and the photo cell. The voltage drop through resistor 97 reduces the positive bias on the amplifier tube to such extent that a sharp decrease in plate current is occasioned. Since impedance 99 is of high reactance, a relatively high inductive voltage is developed that opposes or tends to prevent such decrease in plate current. This voltage occurs instantaneously across grid 13 of the glow discharge device 10, causing it to break down and pass current in the same manner as described in connection with Figs. 1, 2 and 3. The high voltage which is developed in the impedance when the plate current of the amplifier tube tends to decrease passes through blocking condenser 135 and creates a momentary voltage drop across resistor 95 that neutralizes the negative bias normally applied to the grid of device 10 by section 93 of the potentiometer, causing device 10 to break down in the same manner as described in connection with its operation in the system of Fig. 1.

The system shown in Fig. 6 is a modification of the system shown in Fig. 5 and is arranged to provide for the simultaneous operation of two glow discharge devices 10 and 10' in the same or similar fashion that these devices operate in the system of Fig. 4. The current output of the glow discharge device 10 of Fig. 6 is utilized to operate a solenoid sender 21, while the output current of glow discharge device 10' is utilized to measure and/or record certain characteristics of the variable which is under the control or regulation of the solenoid sender.

The difference between the system shown in Fig. 6 and that illustrated in Fig. 5 is merely in the inclusion of potentiometer sections 93' and 96' to provide the grid of glow discharge device 10' with the normal negative bias, a protective resistor 95', and a blocking condenser 135' connected to the plate side of impedance 99 and the junction of the protective resistor 95' with grid 13 of device 10'.

Figure 6A:
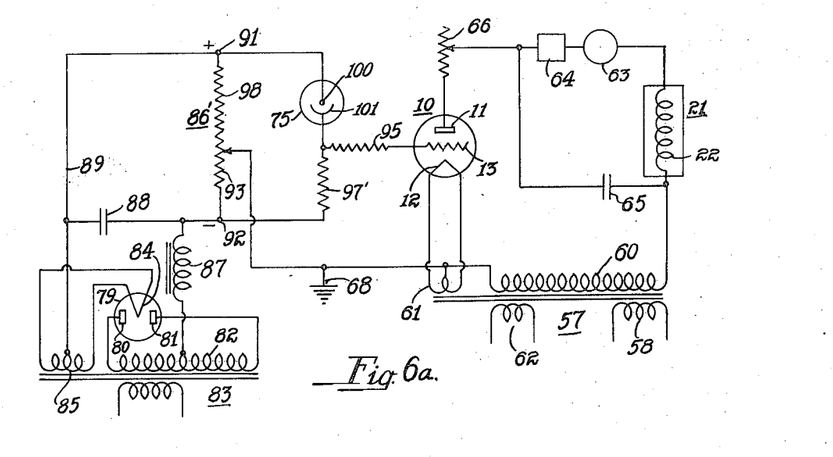
Fig. 6a is a diagrammatic view of a modified circuit arrangement in which the output of the glow discharge device is controlled by a photoelectric or light sensitive device without an intervening amplifier.
Figure 6B:
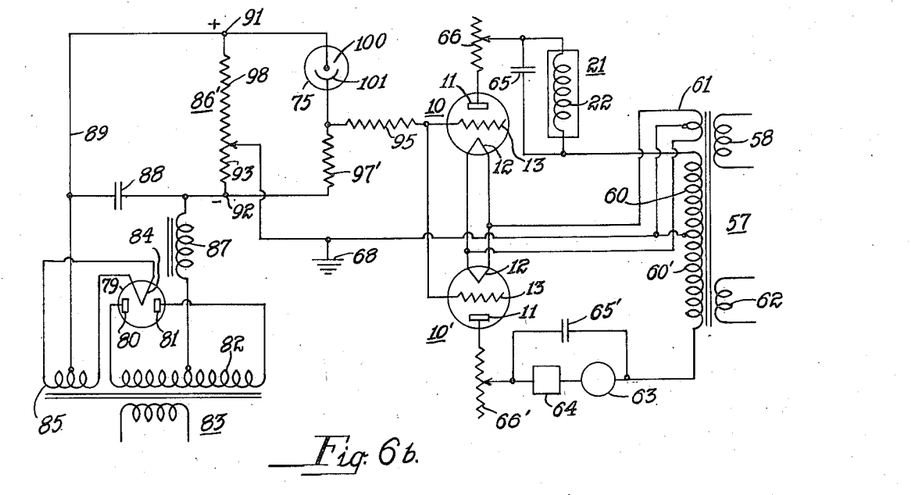
Fig. 6b is a diagrammatic view of a circuit arrangement such as shown in Fig. 6a in which the output of two glow discharge devices is effected by a photoelectric or light sensitive device.

In Figs. 6a and 6b, modifications of the single and double glow-discharge device type systems are illustrated. The system of Fig. 6a, so far as its mode of operation is concerned, is a simplified form of the systems illustrated in Figs. 1 and 4. The system has been simplified by the omission of the amplifier 71 and potentiometer section 96 of Figs. 1 and 4; by the connection of resistors 97' and 95 in series between grid 13 of device 10 and the negative terminal 92 of the potentiometer, and the connection of cathode 101 of the photoelectric device 75 to the junction of resistors 97' and 95. Section 93 of the potentiometer provides the normal fixed negative bias for grid 13 which normally prevents the passage of current in the plate circuit of device 10 in the same manner as in Figs. 1 and 4.

When the photoelectric device 75 is illuminated with a beam of light in the manner described in connection with Figs. 1 and 4, current flows through this cell and resistor 97' having high resistance. The voltage drop across resistor 97' is positive and neutralizes the negative bias furnished by section 93 of the potentiometer and makes the grid 13 of device 10 positive so that current flows in the plate circuit of said device, causing device 21 to function in accordance with the magnitude of the plate current, device 63 to indicate the magnitude of the current and device 64 to record the variations in the magnitude of the plate circuit current. As may be observed by inspection of the circuit in Fig. 6a, resistor 95 becomes positive when current flows in device 75 because the direction of the flow of current in resistor 97 is from its junction with resistor 95 to the negative terminal 92 of the potentiometer.

The circuit shown in Fig. 6b is the same as the circuit shown in Fig. 6a except that an additional glow-discharge device is employed and is designated by reference character 10'. In this system only the solenoid of device 21 is included in the plate circuit of glow-discharge device 10 while the indicating instrument 63 and the recording instrument 64 are connected in the plate circuit of device 10'. Winding 60' of transformer 57 provides the alternating current voltage for the plate circuit of device 10' and winding 60 provides the alternating current voltage for the plate circuit of device 10 and these voltages are 180° out of phase so that device 10 passes current during one of the half cycles of the alternating current voltage and device 10' passes current during the other of the half cycles.

By the arrangement shown in Fig. 6b, two separate and distinct electrical impulses may be obtained from the same variable under measurement and/or regulation, that is for each position of the light beam, in the same manner as described in connection with the system of Figs. 4 and 6.

In the circuits of Figs. 6a and 6b, it is preferred to employ 50% more or less voltage across the photoelectric device 75 and to increase the illumination of device 75 by three or four times the amount of illumination employed on device 75 in Figs. 1, 4, or 5.

In the description of Figs. 4, 5, 6, 6a, and 6b, it is to be noted that the light source and reflecting mirror have been omitted but it is to be understood that in the complete system the light source, lens, mirror, disc and photoelectric cell arrangement shown in Figs. 7, 8, and 9 and in Fig. 1 may be utilized.

In some cases it may be desirable to omit the reflecting mirror and in its place utilize a light source arrangement such as shown in Fig. 11. In Fig. 11 the light source arrangement comprises a unitary structure having a stock 138 which is fulcrumed on a knife-edge 139 and provided at one end with a housing 140 in which a light bulb 141 is disposed. The electrical conductors 142 for the light bulb may be contained in the stock, and be connected to transformer winding 62. The open end of the housing may be provided with a lens 143 adapted to focus emitted light on the photoelectrical cell so that when disc 78 is rotating, the photo cell may be illuminated momentarily in the same fashion as described in connection with Figs. 1, 7 and 8.

The light unit of Fig. 11 may be tilted by a bellows 145 disposed in a chamber 146 connected to a pipe line or any other medium containing a variable to be measured and/or regulated. As the bellows expands or contracts, the light source unit rocks or tilts on the fulcrum and causes a beam of light to move in a radial direction across the face of the rotating disc to accomplish the functions hereinbefore described.

While several forms of the invention have been shown and described herein, it will be appreciated by those skilled in this art that various modifications and changes may be made without departing either from the spirit or the scope of the invention. It is desired, therefore, that only such limitations shall be placed on the invention as are imposed by the prior art and the appended claims.

What we claim as new and desire to secure by Letters Patent is:

1. Apparatus adapted to measure and/or control a variable comprising a thermionic tube of the glow discharge type and having plate and grid circuits, a source of interrupted positive voltage for the plate circuit, a source of voltage for the grid for normally biasing the tube to zero plate current, and an impedance in circuit with the grid circuit which when traversed by current induces a steep wave front voltage of a value to render the grid sufficiently positive to effect a flow of current in the plate circuit, a photo-electric cell connected in circuit with said impedance, a light source focused to project a beam of light on said cell to cause current to traverse said impedance, means for shifting the point at which the light beam impinges on said cell in accordance with changes in said variable, and a rotating disc interposed between the light source and photo-cell, said disc having a slot through which the light beam shines, said slot extending at an angle intersecting a radius of the disc, means for driving the disc at such speed that the slot sweeps through the plane of movement of the light beam during the time of application of voltage to the plate circuit, whereby the length of time that current flows in the plate circuit between points of interruption of the plate voltage is made to depend upon and vary with each position of the light source.

2. Apparatus adapted to measure and/or control a variable comprising a thermionic tube of the glow discharge type and having plate and grid circuits, a source of interrupted positive voltage for the plate circuit, a source of voltage for the grid for normally biasing the tube to zero plate current, and an impedance in circuit with the grid circuit which when traversed by current induces a steep wave front voltage of a value to render the grid sufficiently positive to effect a flow of current in the plate circuit, a photo-electric cell connected in circuit with said impedance, a light source focused to project a beam of light on said cell to cause current to traverse said impedance, means for shifting the point at which the light beam impinges on said cell in accordance with changes in said variable, and a rotating disc interposed between the light source and photo-cell, said disc having a polar curve slot through which the light beam may shine, means for driving the disc at such speed that the slot sweeps through the plane of movement of the light beam during the time of application of voltage to the plate circuit, whereby the length of time that current flows in the plate circuit during the periods that the plate voltage is applied is made to depend upon and vary with each position of the light beam.

3. Apparatus adapted to measure and/or control a variable comprising a thermionic tube of the glow discharge type and having plate and grid circuits, a source of interrupted positive voltage for the plate circuit, a source of voltage for the grid for normally biasing the tube to zero plate current, and an impedance in circuit with the grid circuit which when traversed by current induces a steep wave front voltage of a value to render the grid sufficiently positive to effect a flow of current in the plate circuit, a photo-electric cell connected in circuit with said impedance, a light source focused to project a beam of light on said cell to cause current to traverse said impedance, means for shifting the point at which the light beam impinges on said cell in accordance with changes in said variable, and a rotating disc interposed between the light source and photo-cell, said disc having a slot through which the light beam shines, the graph characteristic of the slot being substantially the same as that of the variable means for driving the disc at such speed that the slot sweeps through the plane of movement of the light beam during the time of application of voltage to the plate circuit, whereby the length of time that current flows in the plate between points of interruption of the plate voltage is made to depend upon and vary with each position of the light source.

4. In combination, a thermionic tube of the glow discharge type having plate and grid circuits and an impedance in circuit with the grid circuit which when traversed by current induces a steep wave front voltage, the grid of said tube being normally biased to effect zero plate current, a source of supply of regularly recurrent positive voltage for the plate circuit of said tube, a photo-electric cell electrically coupled to the grid of said tube, a light source focused to project a light beam on said photoelectric cell, means for oscillating the light beam in the path of the photo-electric cell in accordance with a condition to be controlled, and a rotating disc, operating at constant speed, interposed between the light source and the photoelectric cell, said disc having a slot through which the light beam shines, said slot extending at an angle so as to intersect a radius of the disc, whereby the time in respect to the duration of the said positive plate voltage at which the photoelectric cell is energized and the length of time, during the periods said plate voltage is positive, that the tube passes current are made dependent on the position of the light beam.

5. In combination, an amplifying tube having plate and grid circuits and an impedance in circuit with the plate circuit which when traversed by current induces a steep wave front voltage, the grid of said tube being normally biased to effect zero plate current, a photoelectric cell connected to the grid of said tube, a light source focused on said photoelectric cell, means for oscillating the light source in accordance with a condition to be controlled, and a rotating disc operating at constant speed interposed between the light source and the photoelectric cell, said disc having a slot through which the light source shines, said slot being in the plane of the disc and extending at an angle so as to intersect a radius of the disc, whereby the time at which the photoelectric cell is energized and the amplifying tube caused to pass current is dependent on the position of the light source, and a grid glow discharge device having plate and grid circuits, said device being normally biased to zero plate current and having the grid thereof connected to the said impedance, a source of alternating current voltage for the plate circuit, and means for operating said rotating disc in synchronism with said plate voltage, whereby the steep wave front voltage induced in said impedance is caused to be applied at such times to the grid of said glow discharge device as are fixed by the position of the light source and the shape of the slot.

6. The combination with a glow discharge device having plate and grid circuits, a source of alternating current voltage for said plate circuit and a source of direct current voltage for the grid circuit normally biasing said device to zero plate current, a photoelectric amplifier including an impedance connected to the grid of the discharge device and adapted when energized to induce a positive steep wave front voltage of sufficient magnitude to break down said discharge device and cause it to pass current in the plate circuit, a source of light for energizing the photoelectric amplifier, and means for oscillating the light source by and in accordance with a variable to be measured and/or controlled, of a rotating disc and means for revolving it in synchronism with the plate circuit voltage of the glow discharge device, said disc having non-concentric slots therein, each extending through an angle of 180 electrical degrees so that as the point at which the light source shines on the disc varies the steep wave front voltage will be applied to the grid of the glow discharge device at a definite but different time in the positive cycle of the plate voltage wave for each point that the light source shines on said disc.

7. The combination set forth in claim 6 including a solenoid in circuit with the plate circuit of the glow discharge device, an armature operated by said solenoid, a source of motive fluid, and valve mechanism operated by said armature for varying the pressure at which said fluid is delivered from the source to a receiving line.

8. In combination, a glow discharge device having plate and grid circuits, and a solenoid in the plate circuit, a source of alternating current voltage for the plate circuit and a source of direct current voltage for the grid circuit of such value and polarity as to bias the device to zero plate current, a source of actuating fluid under pressure, a control impulse line leading to apparatus to be regulated, and a valve operated by said solenoid for varying the pressure in the impulse line by and in accordance with the magnitude of the current in said plate circuit, of means for impressing an instantaneous positive voltage on the grid of said device to cause the device to discharge, and means responsive to a variable to be measured and/or controlled and operating in synchronism with the plate circuit voltage for causing said instantaneous voltage to be applied at such times in the positive half cycles of the plate voltage that the current traversing the plate circuit will vary in accordance with said variable.

9. In combination, a glow discharge device having plate and grid circuits, and a solenoid in the plate circuit, a source of alternating current voltage for the plate circuit and a source of direct current voltage for the grid circuit of such value and polarity as to bias the device to zero plate current, a source of actuating fluid under pressure, a control impulse line leading to apparatus to be regulated, and a valve operated by said solenoid for varying the pressure in the impulse line by and in accordance with the magnitude of the current in said plate circuit, of means for developing a substantially instantaneous voltage for the grid circuit, means operating in synchronism with said plate voltage for causing said grid circuit voltage to be applied once in a half cycle of the plate voltage, and means responsive to a variable to be measured and/or controlled for causing said instantaneous voltage to be applied to the grid of said device at such times in the positive half cycles of said plate circuit voltage that the current in said plate circuit will vary by and in accordance with changes in said variable.

10. In combination, a glow discharge device having plate and grid circuits, a pressure sending device adapted to deliver micromatic changes in pressure to a regulating device, an electro responsive device in circuit with the plate circuit of said discharge device for controlling the pressure sending device in accordance with the value of current in the plate circuit, a source of alternating current for said plate circuit and a source of direct current voltage for the grid circuit normally biasing said discharge device to zero plate current, a source of instantaneous positive voltage for said grid which when applied causes current to flow in the plate circuit, means for causing said voltage to be applied once in each positive half cycle of the plate circuit voltage, and means responsive to a condition to be measured and/or controlled for varying the time that said voltage is applied in any such half cycle to thereby vary the plate current of said discharge device in accordance with changes in said condition.

11. In combination, a glow discharge device having plate and grid circuits, a source of alternating current voltage for the plate circuit, a source of voltage for the grid circuit for normally biasing said device to zero plate current, means including a photoelectric cell and a grid controlled amplifier for impressing a steep wave front voltage on the grid of the glow discharge device each time the photoelectric cell is energized, means for directing a beam of light on the cell, means operating in synchronism with the plate voltage of the glow discharge device for causing the light beam to strike said cell once in each half cycle of the plate voltage wave and at a definite but different time in each said half cycle for each position of the light beam, and means responsive to a variable to be measured and/or regulated for shifting the position of said light beam.

12. In combination, a glow discharge device having plate and grid circuits, a source of alternating current voltage for the plate circuit, a source of voltage for the grid circuit for normally biasing said device to zero plate current, means including a photoelectric cell and a grid controlled amplifier for impressing a steep wave front voltage on the grid of the glow discharge device each time the photoelectric cell is energized, means for directing a beam of light on the cell, means operating in synchronism with the plate voltage of the glow discharge device for causing the light beam to strike said cell once in each half cycle of the plate voltage wave and at a definite but different time in each said half cycle for each position of the light beam, means responsive to a variable to be measured and/or regulated for shifting the position of said light beam, and means including a pressure sending device operated by and in accordance with the value of the plate current of said discharge device.

13. In combination, a glow discharge device having plate and grid circuits, a source of alternating current voltage for said plate circuit, a source of voltage for the grid circuit for normally biasing said device to zero plate current, means including a photoelectric cell and a grid controlled amplifier for impressing a steep wave front voltage on the grid of the glow discharge device each time the photoelectric cell is energized, means for directing a beam of light on the cell, of a rotating disc interposed between the photo cell and the light beam directing means, means for rotating the disc in synchronism with the plate voltage, said disc having spaced curved slots through which the light beam may shine, each slot extending from an inner portion of the disc towards the periphery thereof and embracing an angle having the same frequency of movement as the frequency of the voltage for the plate circuit of the glow discharge device, said slots depending on the position of the light beam, varying the time in one or the other of the half cycles of the plate voltage wave that said steep wave front voltage is applied to the grid of said discharge device, and means responsive to a variable to be measured and/or regulated for shifting the points at which said light beam shines through said slots.

14. In combination, a glow discharge device having plate and grid circuits, a source of alternating current voltage for said plate circuit, a source of voltage for the grid circuit normally biasing the discharge device to zero plate circuit current, a source of in-phase substantially instantaneous voltage for the grid circuit for effecting a discharge of current in the plate circuit, said instantaneous voltage being always in excess of the critical voltage, means for causing said grid voltage to be applied once in a half cycle of said plate voltage, and means operated by and in accordance with changes in a variable to be measured and/or controlled for controlling the time in one or the other of the half cycles of the plate circuit voltage that said in-phase substantially instantaneous voltage is applied to thereby cause the plate circuit current to vary in accordance with changes in said variable.

15. In combination, a glow discharge device having plate and grid circuits, a source of alternating current voltage for said plate circuit, a source of voltage for the grid circuit for normally biasing the discharge device to zero plate circuit current, a source of positive substantially instantaneous in-phase voltage for the grid circuit for effecting a flow of current in the plate circuit, said instantaneous voltage being always in excess of the critical voltage, means for causing said grid voltage to be applied once in a half cycle of said plate voltage, and means operating in synchronism with the plate circuit voltage for varying the time in one or the other of the half cycles of the plate voltage that said substantially instantaneous in-phase voltage is applied to thereby vary the plate circuit current of said device.

16. In combination, a glow discharge device having plate and grid circuits, a source of alternating current voltage for said plate circuit, a source of voltage for the grid circuit normally biasing the discharge device to zero plate circuit current, a source of positive steep wave-front in-phase voltage for the grid circuit that always exceeds the critical voltage for effecting a discharge of current in the plate circuit, means for impressing said positive voltage on the grid of said glow discharge device to neutralize the normal bias voltage and to effect the flow of current in the plate circuit thereof, and means operating in synchronism with said plate circuit voltage for controlling the time in the positive half cycles of said plate voltage at which said positive steep wave-front voltage is applied to the grid of said device.

17. A combination according to claim 14 characterized by that the source of in-phase voltage comprises an amplifying device having grid and plate circuits, an impedance in the plate circuit and connected to the grid of the glow discharge device which when traversed by varying plate current induces said in-phase voltage, a photoelectric device connected to said amplifying grid circuit to control the passage of current in said circuit, and the time controlling means comprises a rotating disc adjacent said photoelectric cell and having a polar slot extending through an angle of 180 electrical degrees, a motor for driving said disc at synchronous speed with reference to the plate circuit voltage of the glow discharge device, a light source focused to cast a beam of light through said slot and on said photoelectric cell, and means for oscillating the light source in accordance with changes in a variable to be measured and/or controlled, whereby as the position of said light beam changes the time at which the light beam passes through the slot is varied so that for each position of the light beam the glow discharge device will break down and pass current at a different time in the positive half cycle of the plate circuit voltage therefor.

18. In combination, an amplifying tube having plate and grid circuits and an impedance in circuit with the plate circuit which when traversed by a changing current induces a steep wave front voltage, the grid of said tube being normally biased to effect zero plate current, a photoelectric cell connected to the grid of said tube and which when energized changes the grid potential in such direction that current flows in said plate circuit, a light source focused on said photoelectric cell, means for oscillating the light source in accordance with a condition to be controlled, and a rotating disc operating at constant speed interposed between the light source and the photoelectric cell, said disc having a plurality of non-concentric slots disposed 180 electrical degrees apart through which the light source successively shines, said slots each extending through an angle of 180 electrical degrees and having different graphic characteristics, whereby the time in the cycle of rotation of said slots that said photo-cell is energized is made to depend on the shape of the slots and the position of the light source and the number of times the photo cell is energized is made to depend upon the number of slots.

19. A combination such as set forth in claim 18, and a plurality of grid glow discharge devices each having plate and grid circuits, each device being normally biased to zero plate current and each grid thereof being connected to said impedance, a source of alternating current voltage for the plate circuits of said discharge devices, said voltages being of opposite phase, and means for operating said disc in synchronism with the plate circuit voltages of said discharge devices, whereby the glow discharge devices are caused to break down and pass current at such times in the positive half cycles of plate voltages thereof as are fixed by the position of the light source and the shape of the respective slots of said disc and whereby the value of current passed by each device is made to depend on the position of the light beam and the graphic characteristic of its associated disc slot.

20. The method of controlling the current output of a grid controlled glow discharge tube which consists in providing a supply of grid potential which is in phase with the plate voltage, and of a magnitude that always exceeds the critical grid potential, applying said voltage to the grid only when the plate voltage is positive, and varying the instants of time in the positive half cycles of the plate voltage that such grid potential is applied in accordance with the value of current output desired.

21. The method of controlling the value of current in the plate circuit of a grid controlled glow discharge tube which becomes conducting upon the grid receiving a potential above the critical value of the tube and remains conducting until such plate circuit current is interrupted which consists in impressing an alternating current voltage on said tube, providing a source of grid voltage having a value always substantially in excess of the critical value, and in phase with the positive periods of tube voltage, and applying said grid voltage at different times during such positive tube voltage periods in accordance with the value of tube current desired.

22. The method of controlling the current output of a grid controlled glow discharge tube which becomes conducting upon the grid receiving a potential above the critical value of the tube and remains conducting until the current therethrough becomes zero, which consists in impressing an alternating current voltage on said tube, providing a source of direct current voltage for the grid of a value always in excess of the critical tube voltage, applying said voltage to the grid only while the plate voltage is positive, and controlling the time in the periods that the tube voltage is positive, at which said grid voltage is applied to thereby vary the value of tube current in accordance with time of application of the grid voltage.

23. The combination with a glow discharge device having plate and grid circuits, a source of alternating current voltage for the plate circuit and a source of voltage for the grid circuit which normally biases said device to zero plate current, a source of control voltage for the grid and a photoelectric cell for applying said control voltage thereto, and means for projecting a light beam on said cell to energize the same, of a rotating disc and means for revolving it in synchronism with the plate circuit voltage of the glow discharge device, said disc having non-concentric slots therein through which the light beam may shine on the photoelectric cell, each slot extending through an angle of 180 electrical degrees so that the grid control voltage will be applied to the grid of the glow discharge device at a definite but different time in the positive cycle of the plate voltage wave depending on the point at which the light beam shines through said slots, and means for changing the point at which said beam of light shines through said slots.

24. In combination, a glow discharge device having plate and grid circuits, a source of alternating current voltage for said plate circuit and a source of direct current voltage for the grid circuit normally biasing said discharge device to zero plate current, a source of instantaneous positive voltage for said grid which when applied causes current to flow in the plate circuit, means for causing said voltage to be applied once in any positive half cycle of the plate circuit voltage, and means responsive to a condition to be measured and/or controlled for varying the time that said voltage is applied in any half cycle to thereby vary the plate current of said discharge device in accordance with changes in said condition.

25. In combination, a glow discharge device having plate and grid circuits, a source of alternating current voltage for said plate circuit and a source of voltage for the grid circuit normally biasing said discharge device to zero plate current, a source of instantaneous positive voltage for said grid which when applied causes current to flow in the plate circuit, means for causing said voltage to be applied once in any positive half cycle of the plate circuit voltage, and means responsive to a condition to be measured and/or controlled for varying the time that said voltage is applied in any such half cycle to thereby vary the plate current of said discharge device in accordance with changes in said condition.

26. In combination, a glow discharge device having plate and grid circuits, a source of alternating current voltage for said plate circuit and a source of voltage for the grid circuit normally biasing said discharge device to zero plate current, a source of instantaneous positive voltage for said grid which when applied causes current to flow in the plate circuit, means for causing said voltage to be applied once in any positive half cycle of the plate circuit voltage, and means responsive to a condition to be measured and/or controlled for varying the time that said voltage is applied in any half cycle to thereby vary the plate current of said discharge device in accordance with changes in said condition.

27. In combination, a glow discharge device having plate and grid circuits, a source of alternating current voltage for said plate circuit and a source of voltage for the grid circuit normally biasing said discharge device to zero plate current, a source of substantially instantaneous control voltage for said grid which when applied causes current to flow in the plate circuit, means for causing said voltage to be applied once in any positive half cycle of the plate circuit voltage, and means for varying the time that said control voltage is applied in any half cycle to thereby regulate the value of current in the plate circuit of said device.

28. Apparatus for controlling the energization of a light sensitive cell employed to control the application of breakdown voltage to the grid of a glow discharge device operating on interrupted positive plate voltage, comprising means for focusing a beam of light on the photoelectric cell to be energized, a rotatable screen positioned to sweep through the light beam and having a slot therein which is non-concentric with the axis of rotation of the screen and through which the light beam may shine on the photoelectric cell, means for driving the screen at such rotative speed that the slot sweeps past the photoelectric cell in a period of time substantially equal to the period of duration of the plate voltage between interruptions thereof, and means for shifting the light beam along the photo-cell cathode, whereby as the position of the light beam varies the time at which the photo-cell is energized in relation to the period of duration of the plate voltage, is varied.

29. In an electric gage adapted for measuring, recording and/or regulating a variable quantity, the combination with quantity sensitive means, a photo-electric cell, a light source disposed to shine on said cell, means for causing the light source to impinge on said cell at definitely recurrent but different instants of time in definitely recurring time intervals, depending on the value of said quantity, current responsive equipment and means controlled by said photo-electric cell for energizing said equipment in accordance with the instants of time that such light beam impinges on said photo-electric cell.

GEORGE W. SMITH.
JAMES E. SPECHT.